Feb. 9, 1954  A. C. MUELLER  2,668,424
PROCESS FOR COOLING VAPOROUS MATERIALS
Filed Oct. 26, 1950
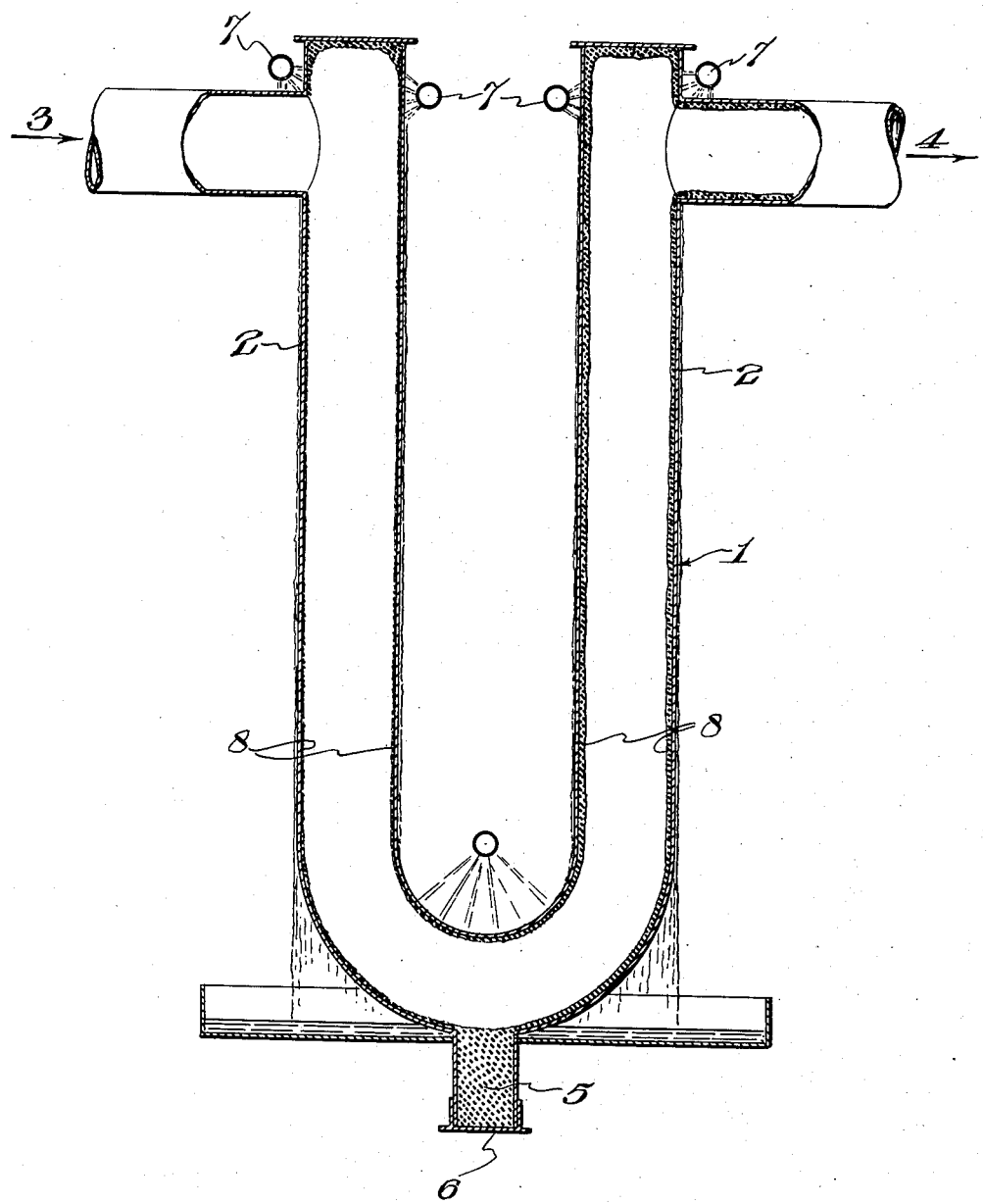
INVENTOR.
Alfred C. Mueller
BY
ATTORNEY.

Patented Feb. 9, 1954

2,668,424

UNITED STATES PATENT OFFICE 2,668,424

PROCESS FOR COOLING VAPOROUS MATERIALS

Alfred C. Mueller, Chadds Ford, Pa., assignor to E. I. du Pont de Nemours and Company, Wilmington, Del., a corporation of Delaware Application October 26, 1950, Serial No. 192,169

5 Claims. (Cl. 62—170)

This invention relates to a process for cooling vaporous substances, and more particularly to a novel process for removing sensible heat from vaporous mixtures, and especially from those which on cooling yield a solid as the first condensed product without causing a material change in vapor composition. Still more particularly it relates to the cooling of vaporous mixtures of metal halides, especially mixtures containing the chlorides of titanium and iron.

The method and efficacy of my invention for cooling vaporous mixtures to remove their sensible heat prior to fractional condensation to separate and recover a desired component thereof are particularly exemplified by its application to processes for producing titanium tetrachloride. That product is readily obtained by reacting a titanium-bearing material, such as ilmenite or rutile ore, or similar $TiO_2$ concentrate, at elevated temperatures (above 600° C. and from, say, 825–1250° C.) with chlorine, usually in the presence of a solid or gaseous reducing agent, such as carbon, charcoal, coal, etc., followed by volatilization of the titanium tetrachloride and other volatile chlorides away from the residual solid mixture. Useful prior art methods for yielding an anhydrous metal chloride volatile at the temperatures of formation include those disclosed in U. S. Patents 1,179,394, 1,528,319, 1,878,013, and 2,184,887. Most titanium-bearing materials employed in such processes contain substantial amounts of iron and, as a consequence, iron (ferric) chloride also forms and is volatilized during the chlorination. The gases leaving the reactor normally comprise titanium tetrachloride, ferric chloride, carbon monoxide, carbon dioxide, unreacted chlorine and minor amounts of other metallic chlorides, including those of silicon or aluminum. If a mixture of chlorine with nitrogen, rather than pure chlorine, is employed in the chlorination, large amounts of nitrogen also will exist in the exhaust gases.

Examples of typical approximate compositions of the reactor discharge gases resulting from a chlorination process in which a mixture of ilmenite and carbon is reacted with a chlorinating gas, comprise the following tabulation:

| | Chlorinating Gas | |
|---|---|---|
| Chlorinating Gas | Case I—100% Chlorine | Case II—30% Chlorine, 70% Nitrogen |
| Titanium tetrachloride | 33.5% by vol | 10% by vol. |
| Ferric chloride (as $Fe_2Cl_6$) | 9.8% by vol | 2.9% by vol. |
| Carbon dioxide | 41.5% by vol | 12.3% by vol. |
| Carbon monoxide | 10.4% by vol | 3.1% by vol. |
| Chlorine | 4.8% by vol | 1.3% by vol. |
| Nitrogen | None | 70.4% by vol. |
| Silicon tetrachloride | Slight amount | Slight amount. |
| Aluminum chloride | do | Do. |

The boiling points at atmospheric pressure of titanium tetrachloride and of ferric chloride are, respectively, 136.4° C. and 315° C. The temperatures at which ferric chloride commences to condense from a gas mixture of the above type, i. e., the snow-points thereof, are approximately 270° C. for case I and 250° C. for case II. The dewpoints for titanium tetrachloride in such mixture are approximately 100° C. and 65° C., respectively. The vapors leave the chlorination furnace at temperatures ranging from 600–1100° C. and must be cooled until the desired metal halide components are obtained by condensation. The recovery and separation of these metal halides has proved particularly difficult owing to the properties and characteristics of ferric chloride. Thus, at temperatures below its boiling point, ferric chloride is a solid and hence condenses directly to that state from the gas phase. In conventional cooling methods, condensation of ferric chloride tends to form a hard deposit upon and reduces heat transfer through the apparatus walls, eventually plugs up the apparatus and causes shutdown of the equipment due to its progressive buildup on such walls.

Various expedients designed to overcome this undesired plugging and apparatus shut-down, as well as to provide a continuous type of chlorination operation, have been proposed. None, however, has proved practically or satisfactorily effective for the intended purpose. Thus, "space coolers" or large volume vessels lined, in many cases, with chemical resistant bricks have been proposed wherein the heat is removed from the vapor and transferred through the brick lining and enclosing metal shell to the atmosphere by natural convection, conduction, and radiation. These units have proved inefficient because of the low heat transfer per unit area. Also, small changes in heat load lead to undesired condensation of those materials which normally condense as solids. To remove this troublesome condensate, unsuccessful resort has been had to mechanically activated knockers, chains and scrapers.

It is among the objects of this invention to obviate these and other disadvantages of prior cooling methods especially those existing in the cooling of vaporous mixtures which yield a solid as the first condensed product, as well as to provide novel methods and means for attaining these objects. A further object is to provide a method for cooling vaporous mixtures which will definitely overcome the disadvantages attendant prior cooling methods, especially those utilizing brick lining construction. A still further object is to provide a commercially useful method for efficiently cooling vaporous mixtures to a temperature down to the snow point and in which the heat insulation is automatically stabilized during operation. A particular object is to provide a novel process for cooling vaporous mixtures containing iron chloride and titanium tetrachloride in a simple metal type cooler. Additional objects and advantages of the invention will be apparent from the ensuing description thereof and from the accompanying diagrammatic drawing which is illustrative of one useful form of apparatus for carrying out the invention and in which The figure is a vertical sectional view of such apparatus.

The foregoing and other objects are attained in this invention which broadly comprises removing sensible heat from a vaporous mixture containing a component which on cooling yields a solid as the first product of the condensation or cooling treatment by passing said mixture through an externally cooled metal conduit, the surfaces of which conduit are maintained in contact with said mixture below the snow point of said vapor mixture, whereby an insulating and protective layer of solid becomes initially formed through condensation and is maintained upon said surfaces, continuing the flow of vapor until a stable operating layer of solids is built up, and thereafter exiting said vaporous mixture from said conduit without altering or materially changing its composition.

In a more specific and preferred embodiment, the invention comprises cooling a vaporous mixture of iron and titanium chlorides to remove sensible heat without materially changing the iron chloride concentration of said mixture during the cooling, by passing the mixture through an externally cooled metal conduit, the interior surface of which is maintained at a temperature below the snowpoint of the hot vaporous mixture, forming an insulating and protecting layer of condensed ferric chloride over said interior surface, and thereafter discharging the mixture from said conduit without further altering its composition.

In one practical application of the invention, involving said preferred embodiment and the use of an apparatus of the type shown in the figure, a gaseous mixture of ferric chloride and titanium tetrachloride having substantially the composition of either cases 1 or 2 above (depending upon whether pure chlorine or a mixture of chlorine with nitrogen is used in their preparation) is conveniently prepared as, for instance, by chlorinating ilmenite at from about 600–1000° C. in the presence of carbon in accordance with prior methods referred to. This mixture is fed, directly if desired, from the chlorinator (or from storage or other source of supply) for passage through the cooling unit 1 consisting, preferably, of a metallic upright U-tube 2 which may be composed of corrosion-resistant metal or alloy, having an inlet 3, a discharge outlet 4, and a cleanout port 5 provided with a removable plugging or capping means 6. Disposed in cooperative association, as shown, with the cooling unit and in direct communication with a supply of water or other suitable cooling fluid at the desired cooling temperature, is a plurality of annular spray ring elements 7 of conventional design and type. These are so arranged about the tubular element 2 that on issue of the cooling medium from said spray elements it passes for flow over the external surfaces of said tubular element 2 in the form of a continuous film to cool and maintain said surfaces at a degree of temperature adapted to cool the vaporous mixture passing therethrough only to above its snowpoint and extract its sensible heat as it passes through the U-tube via inlet 3 and discharge outlet 4. During the initial stages of such passage, ferric chloride is condensed from the hot gaseous mixture and deposits upon the internal surfaces of the U-tube to build up thereon in the form of a relatively thin, insulating layer 8. Such condensation and deposition continues until the exit temperature of the gases leaving the cooling unit becomes stabilized. At that point, further ferric chloride deposition ceases and extraction of sensible heat of the gases under treatment follows without any attendant plugging or stoppage of the precooler unit 1. The precooled exit gases which discharge from the outlet 4 will be found to comprise essentially the same composition as that of the hot gases entering and being charged to the cooler. These cooled exit gases are then treated in accordance with known, useful methods for yielding the condensed metal chlorides, including those disclosed in U. S. Patents 2,446,181, 2,316,275 and 2,245,358. The process of this invention for the preparation of metal halides may be said to comprise three steps: (1) the chlorination operation, wherein the metal halides are formed in their vaporous state; (2) the removal of sensible heat from the vaporous mixture of halides and other constituents; and (3) the condensation to the solid and liquid state and recovery of the desired products. My invention relates particularly to step (2) and is primarily concerned with removal of sensible heat of the vaporous mixture by a cooling operation in which such removal is effected without any substantial attendant or undesired condensation.

To a clearer understanding of the invention, the following example is given. This is merely illustrative and is not to be considered as limiting the underlying principles of the invention:

*Example*

A mixture of ilmenite ore and coke was chlorinated at about 900° C. in a furnace with 29,900 cubic feet of gas containing about 30% chlorine and 70% nitrogen at room temperature being admitted to the furnace per hour, to result in an exit gas from the furnace having a percentage composition substantially the same as that shown in case II of the above table. The amount of titanium tetrachloride and ferric chloride produced per hour was 1,050 and 523 lbs., respectively. The hot gas leaving the chlorination furnace at about 900° C. was then conveyed through the inlet of a cooling duct of an apparatus such as shown in the figure, and cooled to a temperature above the snow-point of the vapor. This apparatus consisted of two lengths of tubular steel piping, each 8 inches in diameter by 35 ft. long, arranged in the form of vertical tubes and suitably connected together by a return bend. Water cooling was applied as a continuous, cascading external film over the exterior surfaces of the piping. The water temperature at the application point was about 20° C. and after contacting and leaving the cooling surface, its temperature was about 50° C. During the initial stages of the cooling operation, a deposit of ferric chloride condensed from the hot gases onto the interior metal surfaces of the cooling conduit being retained thereon in the form of a layer which built up to about ¼ to ½ of an inch in thickness at the hot or inlet end of the cooling conduit and to about 1 to 1½ inches in thickness at its exit end. As the cooling operation proceeded, the exit temperature of the gas from the precooler rose until it reached about 300° C. or slightly above the snowpoint of the vapor. At this exit temperature the operation became stabilized and no further ferric chloride was extracted from the vapor stream, removal of sensible heat being thereafter continued without encountering any further buildup of ferric chloride or undesired plugging of the cooler.

Contrary to previous operations wherein lining of the precooler with refractory material resistant to thermal and chemical attack is resorted to, this invention utilizes a deposit of a condensed component of the vaporous mixture under treatment as an effective protecting and insulating layer on the internal surfaces of the metal cooler shell. In the operation, the vaporous mixture is passed through a suitable tubular or other type metal cooler, the walls of which are maintained below the snowpoint of the gaseous stream. When the vaporous mixture initially flows therethrough, the component which condenses first in solid form is removed from the vapor and forms an insulating and protective solid layer over such internal metal walls. The condensation from the vapor proceeds until a stable operating layer of solids is built up on the interior of the cooler. The operation then continues with the vapor temperature at the cooler exit being maintained at or slightly above the snowpoint and then the composition of the vapor remains essentially unchanged by passage of additional vapor through the cooler.

The term "snowpoint," as used herein, means that temperature at which the vapor pressure of the solid is equal to its partial pressure in the gas phase. At a temperature below the snowpoint, the solid will condense or de-sublimation will occur. At a temperature above the snowpoint, the solid will vaporize, or its sublimation will occur.

The term "sensible heat" means the heat which a vaporous mixture gives up as it cools from the temperature at which it is fed to the cooler to the temperature at which it discharges therefrom without any condensation of vapor.

As already noted, vaporous mixtures operable under my invention comprise those which on cooling yield a solid as the first condensed product. A substance will condense as a solid, from a vaporous mixture undergoing cooling, if the partial pressure of the substance is less than its triple point pressure. The triple point pressure is that pressure at which the three phases (solid, liquid and gas) of the substance exist in equilibrium.

The stable operating layer of solid ferric chloride present in the cooler is maintained within the operating limits by the heat flow to the cooled metal wall. The heat transfer coefficients of the water film, the steel walls, the ferric chloride and the gas films remain relatively constant. Also the temperature of the interior surface of the ferric chloride, that adjacent to the vapor stream being cooled, remains relatively constant and corresponds to the snowpoint of ferric chloride, as determined by its concentration in the hot vapor. The difference in heat transfer conditions exists because of the differential temperature across the gas film layer between the main body of the gas and the interior surface of the solid ferric chloride. Since the main body of the gas at the entrance end of the cooler is at a higher temperature than the gas leaving the cooler, this results in an increased amount of heat transferred per unit area at the hotter end of the cooler. This thickness of the ferric chloride deposit and the heat flux passing through the region in question are interdependent. At the inlet where the vapor stream is hot and the heat transfer rate high, the resistance to the heat transfer must be low and therefore the ferric chloride deposit will be thin. At the outlet where the vapor stream is cooler and the heat transfer rate lower, the resistance to heat transfer must be higher and therefore the deposit of ferric chloride will be thicker.

The average thickness of the stable insulating layer in a given cooler will also vary with changing heat loads caused by changes in production rate of the vaporous mixture. At the production rate for which the cooler was designed, a certain thickness of insulating solid will be achieved; at lower rates the layer will be thicker and at higher than normal the layer will be thinner. Also, at the design production rate, an increase in inlet vapor temperature acts to decrease the average thickness in order that the greater amount of heat may be removed and a decrease in inlet vapor temperature causes the insulating layer to increase in average thickness in order that the temperature will not drop below the snowpoint of the vaporous mixture. Short period fluctuations in heat load caused by changes in vapor thruput rate and/or inlet vapor temperature are compensated for automatically in my novel method by the changes which occur in the protecting and insulating layer of deposited iron chloride. In cases where a given cooling conduit is to be operated for any lengthy period at a heat load much lower than provided for in the design, consideration should be given to decreasing the length of the conduit by disconnecting or bypassing a section. Greater length than necessary to carry out the desired operation leads to condensation of the iron chloride and may cause eventually a high pressure drop and possibly plugging of the cooler. Correct operating conditions are easily detected by measurment of the exit vapor temperature. During stable operation this temperature should not be lower than the snow point of the hot inlet vapor.

If shortening of the conduit is difficult or undesirable in such a case, the section of conduit in which cooling of the vapor to below the snowpoint may occur can be contacted with a heat transfer fluid substantially at the snow point temperature. This insures that condensation will not occur and then this section of conduit serves only as a connecting pipe from the cooler section to subsequent apparatus. It is obvious from the above that my invention provides a very versatile cooling method, the adaptability of which far surmounts that which can be achieved by the use of brick lined or "space" coolers.

The deposit of condensed solids within the precooler is useful as heat insulation and also as a protective coating to prevent corrosion and abrasion of the metal surfaces of the cooler. The thickness of the insulating layer will depend upon the temperature of the gases, the amount of vapor throughput, the snowpoint of the vapor and the temperature of the metal wall of the cooler. In general, the following items are considered in the selection of a metal cooler for use in my invention: inlet temperature of the vapor, vapor heat content, vapor composition, snow- and dewpoints of the vaporous materials, desired outlet vapor temperature, vapor rate, thermal conductivities of solid deposit and metal wall, heat transfer coefficients through vapor film on the inside and the fluid cooling film on the outside, cooling fluid inlet and outlet temperature or the temperature rise, and also chemical corrosion possibilities. The thickness of deposit to be utilized will limit the minimum diameter of the cooling conduit since it is necessary to provide sufficient free area after the insulating and protecting layer has been condensed. The temperature of the exterior surface of the metal is also limited upon such considerations as the heat transfer fluid used (air, water, heat transfer salt, etc.) and chemical and/or thermal effects upon the metal material. Well-known methods of contacting the heat transfer fluid with the exterior surface of the cooling conduit may be utilized such as flowing through an enclosed jacket, contacting by spraying or cascading over the exterior surface, etc. The choice of the metal to be used in the construction of a cooler suitable for use in the method of my invention is dependent upon the needs of the individual problem including economic considerations. In the preferred embodiment, steel or iron comprise satisfactory substances for the metal walls of the cooler. For more severe service, nickel comprises a more suitable material, while for less severe service, aluminum or magnesium can be used. It is apparent that deleterious thermal and chemical effects tend to be minimized because the exterior surface of the metal is cooled by the heat transfer fluid.

In selecting a proper type of cooling apparatus for a particular application, it is obvious that the conduit size should be sufficiently large so that there is a satisfactory rate of flow of the gases to be cooled therethrough after allowing for the area taken by the insulating layer which builds up on the interior surface. Additionally, the conduit should be of such length that the desired heat removal is accomplished but is not so long that undesirable condensation of solid takes place. It is obvious to one understanding the principles of my invention that a cooling tube which is oversize (as to diameter) is at least partially self-correcting by a thick buildup of the solidifying component. Heat transfer data and formulae such as found in Chemical Engineers' Handbook by J. H. Perry will be helpful in predicting and selecting a suitable design for any particular operation.

While described as applied to certain preferred embodiments, the invention is not limited thereto since suitable variation therefrom is contemplated and can be resorted to without departing from its underlying principles and scope. Thus, although particularly useful in the cooling of gaseous mixtures of ferric chloride with titanium tetrachloride, the cooling of vaporous mixtures generally and particularly of ferric chloride with other gaseous compounds or salts, such as the halides (chlorides) of tin, silicon, etc., can also be advantageously effected herein. Also, my cooling method may be applied to removing sensible heat from suitable vaporous mixtures containing as a component such organic compounds as phthalic anhydride, B naphthol, salicylic acid, pyrogallol, anthracene or benzoic acid; and also suitable vaporous mixtures containing as a component inorganic compounds such as iodine, mercuric chloride, or halides of chromium, zirconium and aluminum, etc.

I claim as my invention:

1. A process for removing sensible heat from a vaporous mixture which on cooling yields a solid as the first product of condensation, which comprises flowing said vapor continuously through a metal cooling conduit, the exterior surfaces of which are maintained at a temperature below the snowpoint of said vapor, forming and maintaining throughout the cooling and sensible heat removal operation a protective layer of the condensed solid on the interior surfaces of said cooling conduit, and thereafter exiting said vapor from said conduit at a stabilized temperature without materially changing its composition on introduction to said conduit.

2. A method for cooling a vaporous mixture containing a component which condenses to the solid phase on cooling which comprises flowing said vapor continuously through a metal cooling conduit over the exterior surfaces of which a heat transfer fluid is concurrently flowing in amount sufficient to maintain the interior surfaces of said conduit below the snowpoint of said vapor mixture, initially forming and subsequently maintaining throughout the cooling and sensible heat removal operation a protecting and insulating stabilized layer of said solid phase component on the interior surfaces of said conduit, and thereafter discharging the vapor from said conduit at a stabilized temperature after extraction of sensible heat in substantially the same composition form as introduced into said conduit.

3. A process for cooling and removing sensible heat of a vaporous product resulting from the chlorination of a material containing titanium and iron compounds without substantially changing the composition of said vapor, comprising flowing said vapor continuously through a metal cooling conduit, the exterior surfaces of which are maintained in contact with a heat transfer fluid at a temperature sufficient to maintain the interior surfaces of said conduit below the snowpoint of said vaporous mixture, initially forming and subsequently maintaining throughout the cooling and sensible heat removal operation a protecting and insulating layer of chloride of iron on the interior surfaces of said conduit, and exiting the vapor mixture therefrom at a stabilized temperature in substantially the same composition as its introduction into said conduit.

4. A process for cooling to remove sensible heat a vaporous mixture which deposits a solid as the first condensed product of its components to a temperature not to exceed the snowpoint of said vapor, comprising continuously flowing said vapor through a metal cooling conduit, the metal surfaces of which are concurrently cooled to below the snowpoint of said vapor, during its initial introduction into said conduit forming and maintaining throughout said sensible heat removal operation a solids deposit of regulated thickness as a protecting and insulating layer upon the internal surfaces of the conduit, and thereafter withdrawing the vapor mixture with sensible heat removed and while said vapor is at a stabilized temperature and substantially the same in composition as introduced into said conduit.

5. A process for removing sensible heat from a vaporous mixture containing chlorides of iron and titanium without causing a material change in vapor composition which comprises continuously flowing said vapor through a metal cooling conduit while concurrently flowing a cooling fluid maintained at a temperature below the snowpoint of said vapor over the external surfaces of said conduit to form and maintain a layer of solid iron chloride deposit upon the internal surfaces of said conduit and throughout the heat removal operation, controlling the thickness of the layer of said deposited chloride of iron within said conduit by regulating the amount and temperature of said cooling fluid, and withdrawing said mixture at a stabilized temperature from said conduit after extraction of sensible heat and without effecting any substantial change in its composition during said extraction.

ALFRED C. MUELLER.

References Cited in the file of this patent

UNITED STATES PATENTS

| Number | Name | Date |
|---|---|---|
| 2,076,033 | Kniskern | Apr. 6, 1937 |
| 2,245,358 | Pechukas | June 10, 1941 |
| 2,455,314 | Pietzsch | Nov. 30, 1948 |